(12) United States Patent
Takeuchi

(10) Patent No.: US 6,697,082 B1
(45) Date of Patent: Feb. 24, 2004

(54) PROGRAM PRODUCT STORING IMAGE DISPLAY PROGRAM, IMAGE DISPLAY PROGRAM, IMAGE DISPLAY METHOD, AND GAME SYSTEM

(75) Inventor: Hisahiko Takeuchi, Tokyo (JP)

(73) Assignee: Kabushiki Kaisha Square Enix, Tokyo (JP)

(*) Notice: Subject to any disclaimer, the term of this patent is extended or adjusted under 35 U.S.C. 154(b) by 237 days.

(21) Appl. No.: 09/605,850

(22) Filed: Jun. 29, 2000

(30) Foreign Application Priority Data

Jan. 28, 2000 (JP) .................................. 2000-019514

(51) Int. Cl.$^7$ ................................................ G09G 5/00
(52) U.S. Cl. ........................................ 345/629; 345/473
(58) Field of Search .............................. 345/619, 629, 345/633, 473; 348/586

(56) References Cited

U.S. PATENT DOCUMENTS

| | | | | |
|---|---|---|---|---|
| 4,698,666 A | * | 10/1987 | Lake, Jr. et al. | 348/586 X |
| 4,827,253 A | * | 5/1989 | Maltz | 348/586 X |
| 5,519,826 A | * | 5/1996 | Harper et al. | 345/473 |
| 5,995,111 A | | 11/1999 | Morioka et al. | |
| 6,137,919 A | * | 10/2000 | Gonsalves et al. | 348/586 X |

FOREIGN PATENT DOCUMENTS

JP          10222694          8/1998

* cited by examiner

Primary Examiner—Matthew Luu
(74) Attorney, Agent, or Firm—Greenblum & Bernstein, P.L.C.

(57) ABSTRACT

A computer readable storage medium for storing an image display program giving rise to a soft focus effect to a specific portion of a game screen is provided. The program maker a computer generate dummy image data comprising only image portions of at least a predetermined lightness based on original image data comprising a display image; combine the original image data and the dummy image data by a positional relationship where an image common to the original image data and the dummy image data is shifted in position; and display an image based on the combined image data.

20 Claims, 10 Drawing Sheets

| DATA NAME | SETTING DATA | STANDARD VALUES |
|---|---|---|
| NO. OF PRIMARY SHIFT COMBINATION FILTERS (1 TO 8) | N1 | 4 |
| NO. OF SECONDARY SHIFT COMBINATION FILTERS (1 TO 8) | N2 | 4 |
| ADDITION COLOR COMPONENTS AND α-VALUE | (R1, G1, B1, α1) | (127, 127, 127, 124) |
| PRIMARY SHIFT COMBINATION COLOR COMPONENTS AND α-VALUE | (R2, G2, B2, α2) | (127, 127, 127, 4) |
| SUBTRACTION COLOR COMPONENTS AND α-VALUE | (R3, G3, B3, α3) | (127, 127, 127, 20) |
| SECONDARY SHIFT COMBINATION COLOR COMPONENTS AND α-VALUE | (R4, G4, B4, α4) | (127, 127, 127, 20) |
| PRIMARY SHIFT COMBINATION SHIFT DEGREE (0 TO 63) | A1 | 63 |
| SECONDARY SHIFT COMBINATION SHIFT DEGREE (0 TO 255) | A2 | 128 |
| TEXTURE SIZE | L×M | 320×240 |

PROGRAM PRODUCT STORING IMAGE DISPLAY PROGRAM, IMAGE DISPLAY PROGRAM, IMAGE DISPLAY METHOD, AND GAME SYSTEM

The present disclosure relates to subject matter contained in Japanese Patent Application No. 2000-019514, filed on Jan. 28, 2000, the disclosure of which is expressly incorporated herein by reference in its entirety.

BACKGROUND OF THE INVENTION

1. Field of the Invention

The present invention relates to a program product storing an image display program, an image display program, an image display method, and a game system for controlling the screen display in a video game.

2. Description of the Related Art

In general, there is no concept of focus in a game screen. All images are displayed in a focused state. In recent years, however, one practice has been to give a blurred effect to the game image so as to enhance the game play effect. For example, there is the technique described in Japanese Unexamined Patent Publication (Kokai) No. 10-222694.

In this way, it is possible to enhance the game play effect by giving a blurred effect rather than clearly displaying all images. For example, it is possible to clearly display only the characters and blur the background so as to make the characters on the screen stand out more.

Summarizing the problem to be solved by the invention, in photography, there is the technique of focusing on a target object and in that state allowing the light around a bright object to diffuse outward (soft focus). Soft focus enables a soft atmosphere to be given to a still photograph.

In a game image as well, it is possible to enhance the game play effect by soft focus. For example, by giving a soft focus effect to one character, it becomes possible to make that character stand out more in the screen.

There has not been any technique giving a soft focus effect to only one character while drawing characters in real time such as in a game system.

SUMMARY OF THE INVENTION

An object of the present invention is to provide a program product storing an image display program, a image display program, an image display method, and a game system enabling a soft focus effect to be given to only a specific portion of the game screen.

According to a first aspect of the present invention, there is provided a program product storing an image display program for making a computer generate dummy image data comprising only image portions of at least a predetermined lightness based on image data comprising a display image; combine the image data and the dummy image data by a positional relationship where an image shared by the image data and the dummy image data is shifted in position; and display an image based on the combined image data.

According to a second aspect of the present invention, there is provided a program product storing an image display program for making a computer generate first and second dummy image data based on image data comprising a display image of a video game and combining the first and second dummy image data by a positional relationship where an image shared by the first and second dummy image data is shifted; acquire third dummy image data comprising only image portions of at least a predetermined lightness based on the combined image; combine the acquired third dummy image data with the image data; and display an image based on the image data combined with the third dummy image data.

According to a third aspect of the present invention, there is provided an image display program for making a computer generate dummy image data comprising only image portions of at least a predetermined lightness based on image data comprising a display image; combine the image data and the dummy image data by a positional relationship where an image shared by the image data and the dummy image data is shifted in position; and display an image based on the combined image data.

According to a fourth aspect of the present invention, there is provided an image display program for making a computer generate first and second dummy image data based on image data comprising a display image of a video game and combining the first and second dummy image data by a positional relationship where an image shared by the first and second dummy image data is shifted; acquire third dummy image data comprising only image portions of at least a predetermined lightness based on the combined image; combine the acquired third dummy image data with the image data; and display an image based on the image data combined with the third dummy image data.

According to a fifth aspect of the present invention, there is provided an image display method comprising storing an image display program for making a computer generate dummy image data comprising only image portions of at least a predetermined lightness based on image data comprising a display image; combine the image data and the dummy image data by a positional relationship where an image shared by the image data and the dummy image data is shifted in position; and display an image based on the combined image data.

According to a sixth aspect of the present invention, there is provided an image display method comprising storing an image display program for making a computer generate first and second dummy image data based on image data comprising a display image of a video game and combining the first and second dummy image data by a positional relationship where an image shared by the first and second dummy image data is shifted; acquire third dummy image data comprising only image portions of at least a predetermined lightness based on the combined image; combine the acquired third dummy image data with the image data; and display an image based on the image data combined with the third dummy image data.

According to a seventh aspect of the present invention, there is provided a game system provided with a computer readable program product storing a program for controlling an image display of a video game, a computer for reading out and executing at least part of the program from the program product, and a display for displaying a video game realized by the computer; the computer, by reading part of the program from the program product, generating dummy image data comprising only image portions of at least a predetermined lightness based on image data comprising a display image, combining the image data and the dummy image data by a positional relationship where an image shared by the image data and the dummy image data is shifted in position, and displaying an image based on the combined image data.

According to an eighth aspect of the present invention, there is provided a game system provided with a computer readable program product storing a program for controlling an image display of a video game, a computer for reading out and executing at least part of the program from the program product, and a display for displaying a video game realized by the computer; the computer, by reading part of the program from the program product, generating first and second dummy image data based on image data comprising a display image of a video game and combining the first and second dummy image data by a positional relationship where an image shared by the first and second dummy image data is shifted, acquiring third dummy image data comprising only image portions of at least a predetermined lightness based on the combined image, combining the acquired third dummy image data with the image data, and displaying an image based on the image data combined with the third dummy image data.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Preferred embodiments of the present invention will be explained below with reference to the drawings. Note that the following explanation will be given with reference to the example of application of the present invention to a home game system.

Figure 1:
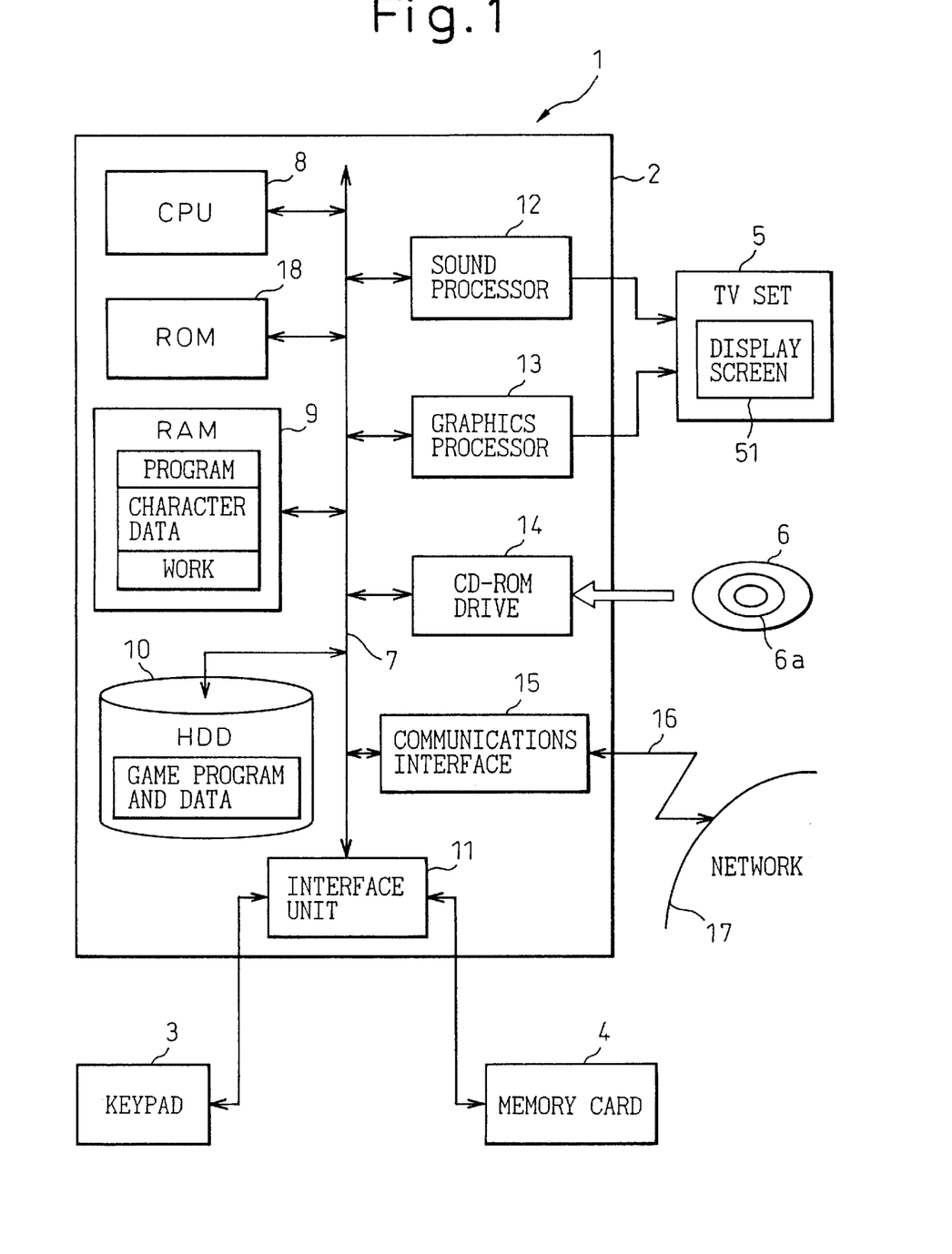
FIG. 1 is a block diagram of the overall configuration of a game system using an embodiment of the present invention.

FIG. 1 is a block diagram of the configuration of a game system according to an embodiment of the present invention. The game system 1 for example includes a game console 2, keypad 3, memory card 4, TV set 5, and CDMA COMMUNICATION SYSTEM-ROM 6.

The game console 2 is for example comprised of a central processing unit (CPU) 8, read only memory (ROM) 18, random access memory (RAM) 9, hard disk drive (HDD) 10, interface unit 11, sound processor 12, graphics processor 13, compact disc read only memory (CDMA COMMUNICATION SYSTEM-ROM) drive 14, loadable CDMA COMMUNICATION SYSTEM-ROM 6, and communications interface 15 connected to each other through a bus 7.

The CPU 8 successively executes a program stored in the RAM 9 based on a boot program or operating system (OS) or other basic program stored in the ROM 18 so as to advance the game. The CPU 8 controls the operation of the parts 9 to 15 in the game console 2.

The RAM 9 is used as the main memory of the game console 2 and stores the programs or data required for advance of the game transferred from the CDMA COMMUNICATION SYSTEM-ROM 6. The RAM 9 is also used as a work area at the time of execution of a program. The areas assigned in the RAM 8 and the data stored in the areas will be explained later.

The HDD 10 stores the game program and data fetched from an external network 17 through the communications interface 15 and communications line 16. The interface unit 11 is connected to a detachable keypad 3 and a memory card 4. The interface unit 11 controls the transfer of data between the keypad 3 and memory card 4 and the CPU 8 or RAM 9. Note that the keypad 3 is provided with direction keys and various types of buttons. By operating these keys and buttons, the player inputs commands to its own character for movement, commands for actions, and other commands required for advance of the game. Further, the memory card 4 saves data showing the state of game advance.

The sound processor 12 performs processing for playing back background music (BGM), sound effects, and other sound data in accordance with the status of game advance and outputs it as an audio signal to a TV set 5.

The graphics processors 13 performs three-dimensional graphics processing in accordance with instructions from the CPU 8 to generate image data in accordance with the state of game advance. The graphics processors 13 adds a predetermined synchronization signal to the generated image data and outputs the result to the TV set 5 as a video signal.

The CDMA COMMUNICATION SYSTEM-ROM drive 14 drives the CDMA COMMUNICATION SYSTEM-ROM 6 set in the game console 2 in accordance with instructions from the CPU 8 so as to transfer programs or data stored in the CDMA COMMUNICATION SYSTEM-ROM 6 to the RAM 9 through the bus 7.

The communications interface 15 is connected through the communications line 16 to the external network 17 and performs processing for transfer of programs and data with the external network 17 in accordance with the instructions from the CPU 8.

The CDMA COMMUNICATION SYSTEM-ROM 6 stores the programs and data required for game advance (game program 6a). The CDMA COMMUNICATION SYSTEM-ROM 6 is driven by the CDMA COMMUNICATION SYSTEM-ROM drive 14 for readout of the stored programs or data. The programs or data read from the CDMA COMMUNICATION SYSTEM-ROM 6 are transferred from the CDMA COMMUNICATION SYSTEM-ROM drive 14 through the bus 7 to the RAM 9.

The TV set 5 is provided with a display screen 51 comprised of a cathode ray tube (CRT) for displaying an image corresponding to the video signal from the graphics processor 13 and speakers (not shown) for outputting sound corresponding to the audio signal from the sound processor 12. Normally, a television receiver is used as the TV set 5.

Figure 2:
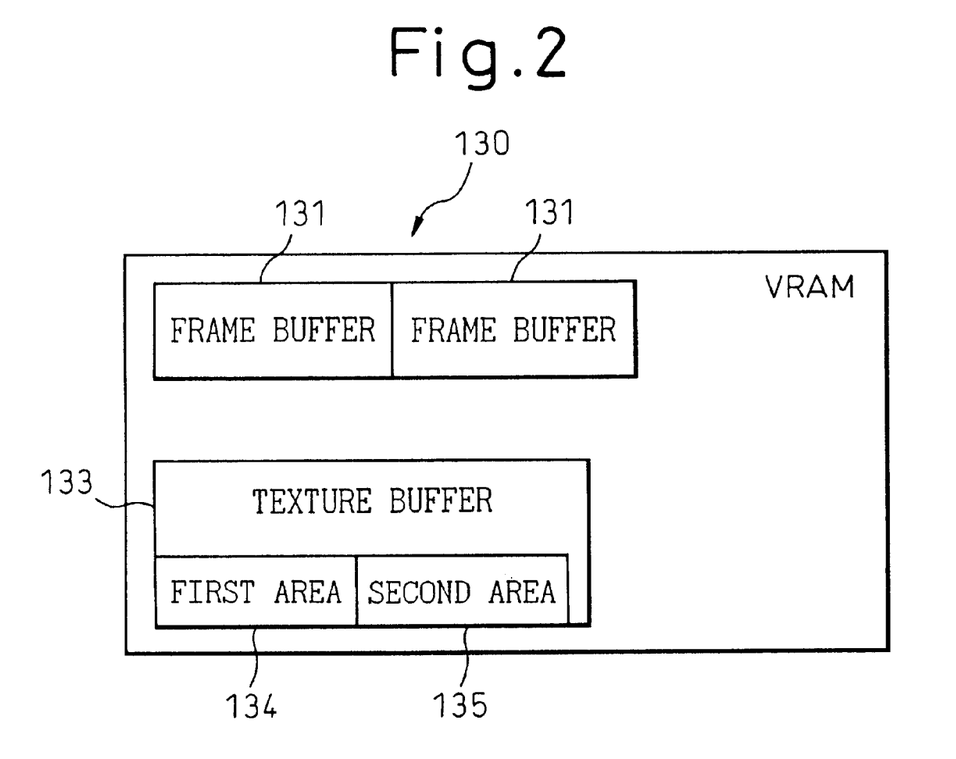
FIG. 2 is a view of the configuration of a VRAM inside a graphics processor.

The graphics processor 13 is provided with the VRAM 130 shown in FIG. 2. The VRAM 130 has a frame buffer 131 and has a texture buffer 133. The texture buffer 133 is provided with a first area 134 and second area 135 for the processing for soft focus.

Figure 3:
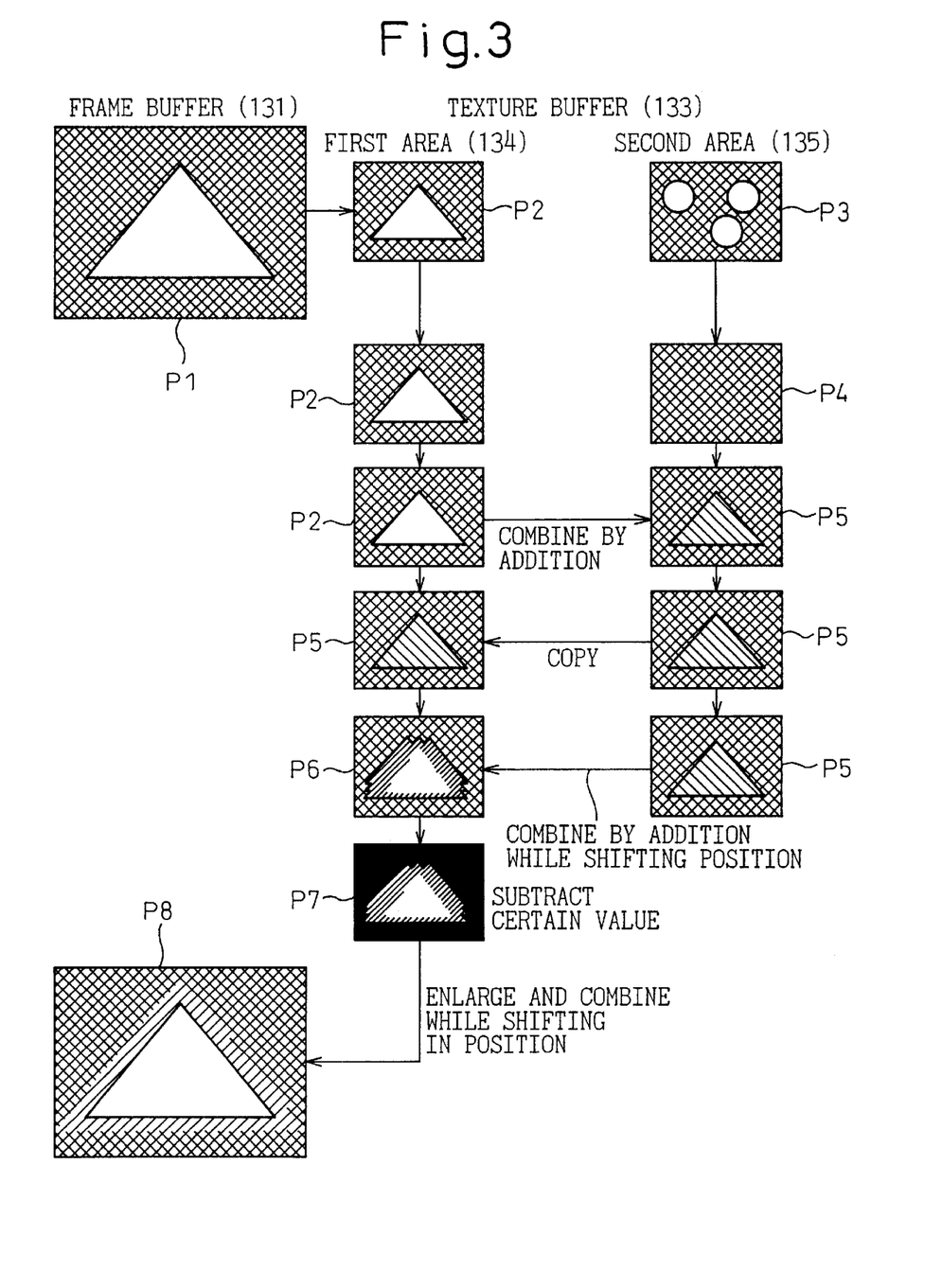
FIG. 3 is an explanatory view of a process of processing of diffused glow processing.

In the present embodiment, the two-dimensional image written into the VRAM 130 is used for the processing for soft focus (diffuse glow). FIG. 3 is a view schematically showing the image transition due to the soft focus processing according to the present embodiment. As shown in FIG. 3, first, the image data P1 drawn in the frame buffer 131 is reduced and written in the first area 134 of the texture buffer 133. As a result, the image data P2 is stored. At this time, for example, filtering called bilinear filtering is performed.

Next, the image data P3 stored in the second area 135 of the texture buffer 135 is cleared. That is, the lightness of each pixel of the second area 133 is set to the lowest value. Further, image data comprising the image data P2 of the first area 134 reduced in lightness is combined by addition with the second area 135. Due to this, the image data P5 comprised of the image data P2 reduced in lightness is stored in the second area 135.

The image data P5 of the second area 135 is copied in the first area 134. Due to this, the same image data P5 is stored in the first area 134 and the second area 135. The image data of the first area 14 at this time is used as the first dummy image and the image data of the second dummy area is used as the second dummy image.

Further, the combination by addition to the first area is repeated using the image comprised of the image data P5 of the second area 135 reduced in lightness as a filter. This combination by addition is performed while shifting the position slightly. This processing will be called primary shift combination from here. Due to this, the image data P6 subjected to the blurring is stored in the first area 134.

Further, a predetermined value is subtracted from the value of the lightness of the image data P6 of the first area 134. Due to this, the portions with a lightness lower than the subtraction value in the image data P6 are set to the lowest lightness. That is, the image data P7 of the first area is the image data comprising only the portions which had a lightness higher than the subtraction value in the image data P6 before subtraction. The image data P7 is an adjustment image for giving a soft focus effect to the image data P1 of the frame buffer 131.

The image data P7 of the first area 134 is enlarged and repeatedly combined in the frame buffer 131 while being shifted in position. The combination at this time is for example semitransparent combination. This processing will be called secondary shift combination after this. The image data P7 is the image data obtained by blurring the image data P1 of the frame buffer and then leaving only the portions with the high lightness. By combining the image data P7 in the frame buffer 131 while shifting the position, image data P8 emphasized in the brightness around the portions of a high lightness of the image data P1 is stored in the frame buffer 131. That is, the image data P1 drawn in the frame buffer 131 is processed for soft focus.

Note that in the present embodiment, due to the subtraction, only the portions with a lightness of more than a predetermined value are left. Due to this, the lightness of the remaining portions becomes a lightness lower than before the subtraction. Therefore, when combining data in the frame buffer 131, the image of the frame buffer 131 will not become too bright even if combining data repeatedly a plurality of times.

Next, the data structure and processing routine for working the present embodiment will be explained in detail.

Figure 4:
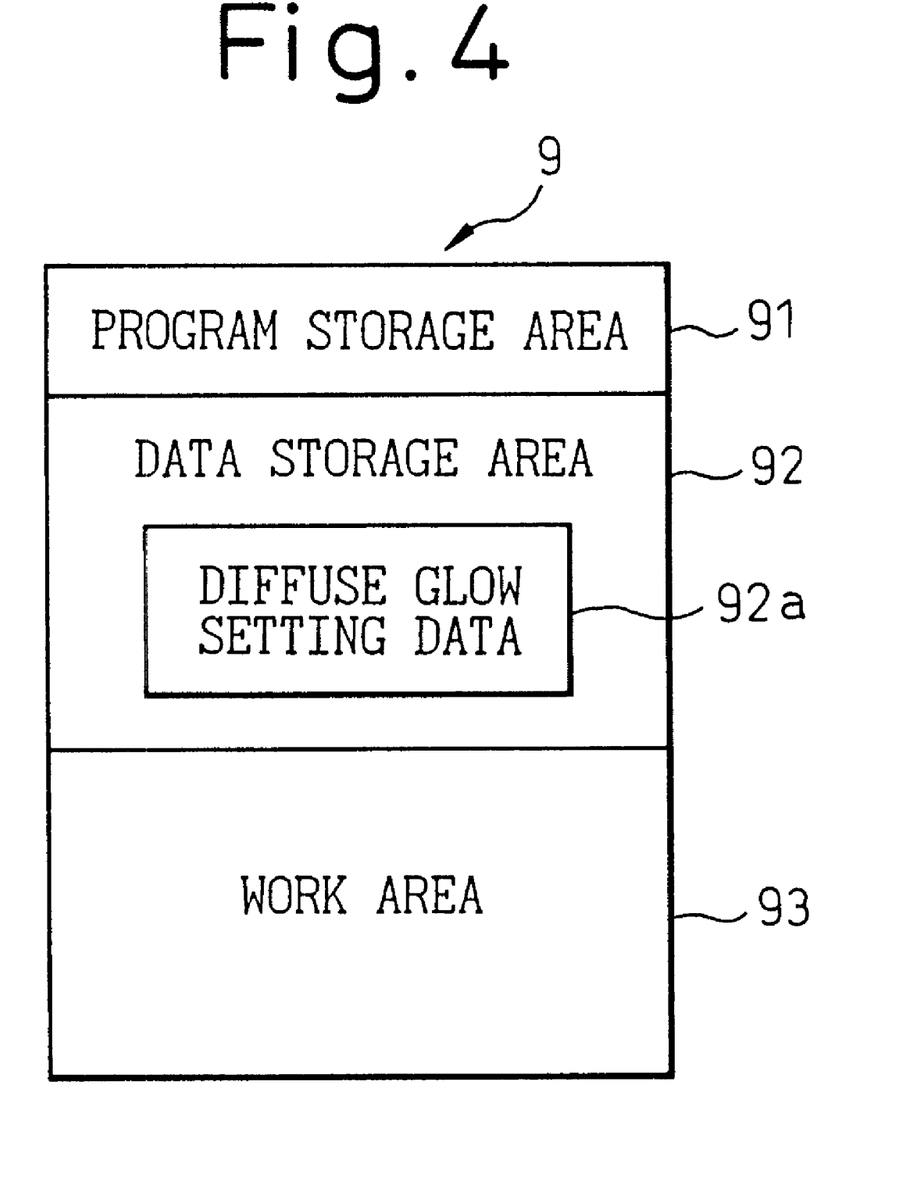
FIG. 4 is a view of areas allocated in a RAM.

FIG. 4 is a view of an example of the areas assigned in a RAM. As illustrated, for example, a program storage area 91, data storage area 92, work area 93, etc. are assigned in a RAM 9. The programs and data stored in the program storage area 91 and the data storage area 92 are read by the CDMA COMMUNICATION SYSTEM-ROM drive 14 from the CDMA COMMUNICATION SYSTEM-ROM 6 and transferred to the RAM 9 under the control of the CPU 8.

The program storage area 91 stores the programs necessary for execution of the game such as program shown in the later explained flowchart. The data storage area 92 stores the diffuse glow setting data 92a etc.

Figure 5:
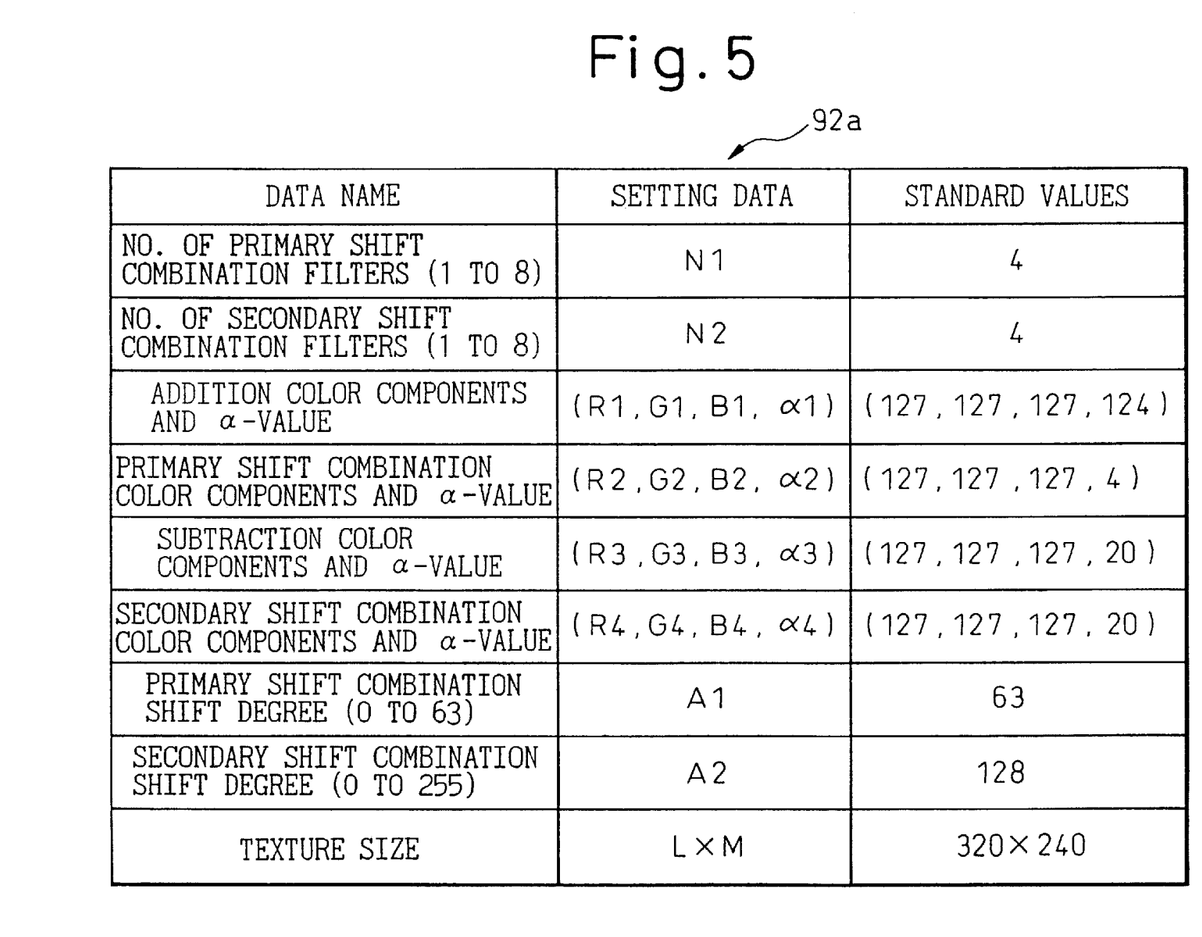
FIG. 5 is a view of an example of the diffused glow setting data.

FIG. 5 is a view of an example of the diffuse glow setting data stored in the data storage area. For example, the diffuse glow setting data 92a, as shown in FIG. 5, records the setting data and standard values linked with the data names. The setting data is data which is freely set. The standard values are data becoming effective when registration of data in the setting data is omitted.

The diffuse glow setting data 92a is for example comprised as follows. The numbers of overlaid filters when performing primary shift combination on the texture buffer 133 are registered in the NO. OF PRIMARY COMBINATION FILTERS row of the DATA NAME column. Natural numbers of 1 to 8 may for example be registered for that data. In the example of FIG. 5, N1 is registered for the setting data of the number of primary combination filters and "4" for the standard value.

The numbers of overlaid filters when performing secondary shift combination, on the frame buffer 131 are registered in the NO. OF SECONDARY COMBINATION FILTERS row of the DATA NAME column. Natural numbers of 1 to 8 may for example be registered for that data. In the example of FIG. 5, N2 is registered for the setting data of the number of secondary combination filters and "4" for the standard value.

The color components and α-value (R, G, B, and α) in the combination by addition on the texture buffer 133 are registered in the ADDITION COLOR COMPONENTS AND α-VALUE row of the DATA NAME column. Here, the α-value at the time of the combination by addition shows the amount of increase or decrease of the lightness of the combined image. That is, the value of α/128 is multiplied with the lightness of each pixel of the image data to adjust the lightness. The image data adjusted in lightness is added to the other image data (image data of second area 135). In the example of FIG. 5, (R1, G1, B1, and α1) are registered for the setting data of the addition color components and α-value and (127, 127, 127, and 124) are registered for the standard values.

The color components and α-value (R, G, B, and α) at the time of the primary shift combination are registered in the PRIMARY SHIFT COMBINATION COLOR COMPONENTS AND α-VALUE row of the DATA NAME column. When performing the primary shift combination by combination by addition, the α-value shows the value of increase or decrease of lightness of the combined image. In the example of FIG. 5, (R2, G2, B2, and α2) are registered for the setting data of the primary shift combination color components and α-value and (127, 127, 127, 4) are registered for the standard values.

The color components and α-value (R, G, B, α) at the time of subtraction are registered in the SUBTRACTION COLOR COMPONENTS and α-VALUE row of the DATA NAME column. In the case of subtraction, the value obtained by multiplying the value of each color component with the α-value/128 is subtracted from the lightness value of each pixel. In the example of FIG. 5, (R3, G3, B3, and α3) are registered for the setting data of the subtraction color components and α-value and (127, 127, 127, 20) are registered for the standard values.

The color components and α-value (R, G, B, α) at the time of secondary shift combination are registered in the SECONDARY SHIFT COMBINATION COLOR COMPONENTS AND α-VALUE row of the DATA NAME column. When performing semitransparent combination in the secondary blurring combination, the α-value indicates transparency. In the example of FIG. 5, (R4, G4, B4, and α4) are registered for the setting data of the secondary shift combination color components and α-value and (127, 127, 127, 20) are registered for the standard values.

The shift degree of the center position of the image at the time of primary shift combination is registered in the PRIMARY SHIFT COMBINATION SHIFT DEGREE row of the DATA NAME column. For example, a natural number of 0 to 63 may be registered. In the example of FIG. 5, A1 is registered for the setting data of the primary shift combination shift degree and 63 for the standard value.

The shift degree of the center position of the image at the time of secondary shift combination is registered in the SECONDARY SHIFT COMBINATION SHIFT DEGREE row of the DATA NAME column. For example, a natural number of 0 to 255 may be registered. In the example of FIG. 5, A2 is registered for the setting data of the secondary shift combination shift degree and 128 is registered for the standard value.

The texture size at the time of reduction of the image data P1 of the frame buffer (number of pixels in horizontal direction×number of pixels in vertical direction) is registered in the TEXTURE SIZE row of the DATA NAME column. This texture size may be the size of the first area and second area. In the example of FIG. 5, L×M is registered for the setting data of the texture size, while 320×240 is registered for the standard value. The standard value is the texture size envisioned when the image size of the frame buffer is 640×480.

Note that (R, G, B, α) all become values from 0 to 255. The α-value shows 1× by 128. Therefore, if α-value is "128", it means to multiply the lightness by 1. If the α-value is "4", it means to multiply the lightness by 4/128. In the following explanation, when speaking of α, it means the value obtained by dividing the data of the α-value shown in FIG. 5 by 128. Note that when shifting the data by the amount of 0.5 dot, the image to be added to is interpolated to calculate the lightness of the corresponding dot for each dot of the image to be added.

In this embodiment of the above configuration, when the game is started, the CPU 8 secures areas for storing information in the RAM 9. Due to this, as shown in FIG. 4, the program area 91, data area 92, work area 93, etc. are secured in the RAM 9. Further, when there is a request for game start, the information required for the game to be started is read from the CDMA COMMUNICATION SYSTEM-ROM 6 to the RAM 9, and the CPU 8 makes the image be displayed on the display screen 51 based on the read game program. The player operates the keys and buttons of the keypad 3 based on the image on the display screen 51 to make the game advance.

Next, an explanation will be made of the processing routine for a game according to an embodiment of the present invention. Note that the processing shown below is processing performed by the CPU 8 controlling the other components in the game console based on the game program stored in the CDMA COMMUNICATION SYSTEM-ROM 6.

Figure 6:
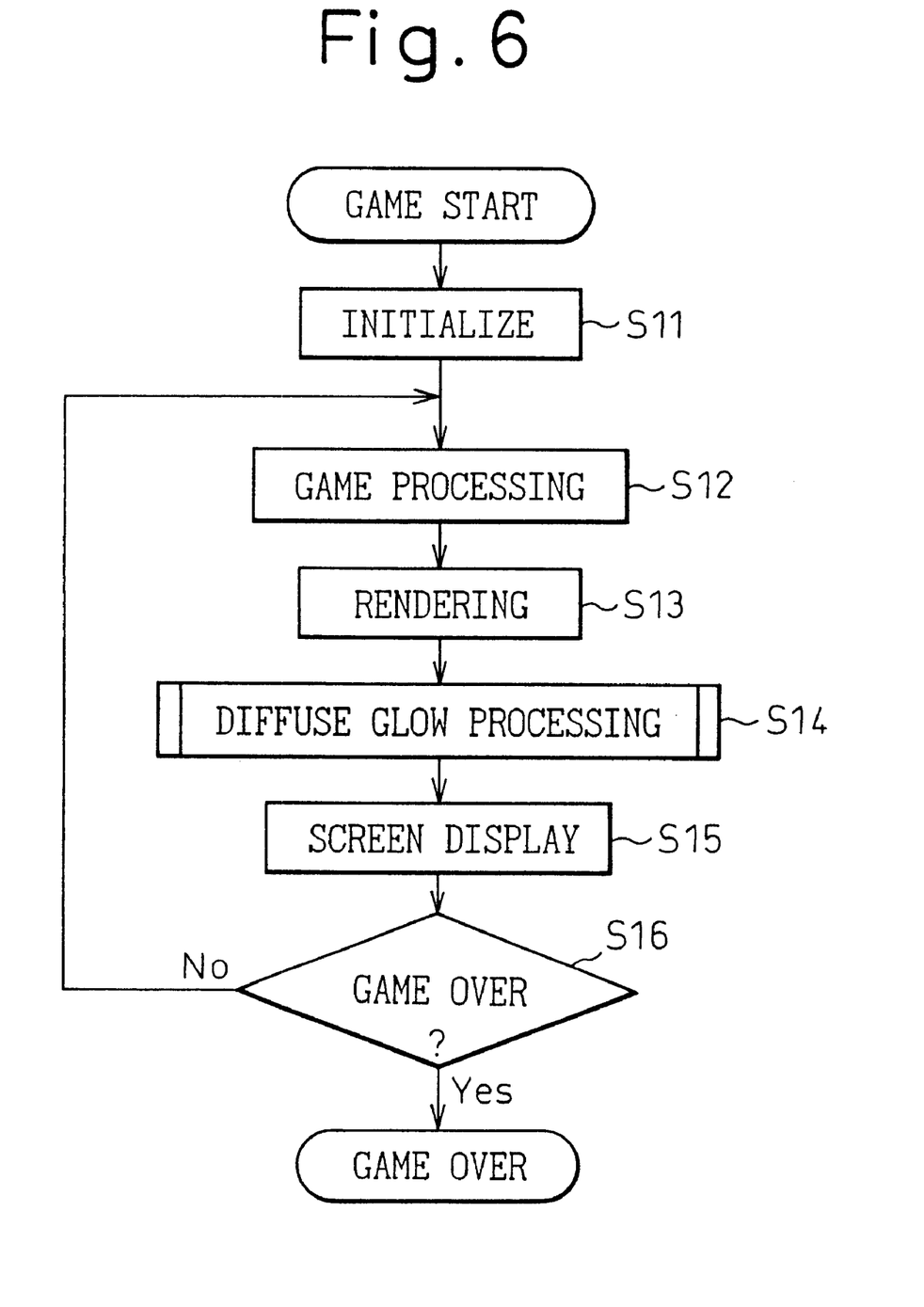
FIG. 6 is a flowchart of processing for progress of the game.

FIG. 6 is a flowchart of the processing of the game as a whole. When the power of the game system 2 is turned on, the system is initialized (step S11). Due to the processing at step S11, the environment is set along with the loading of programs and data from the CDMA COMMUNICATION SYSTEM-ROM 6 to the program area 91 and data area 92, the clearing of the work area 93, etc. Next, the game processing is executed (step S12) whereby processing is performed for advancing the fighting game one frame of the image at a time. Next, rendering is executed (step S13) whereby a two-dimensional image is generated in the frame buffer 131 and characters are written at precalculated positions on the image.

Further, the later explained diffuse glow processing (step S14) is executed, then screen display is executed (step S15). Due to this screen display, the content of the frame buffer 131 finished being processed is displayed on the display screen 51.

Therefore, by performing the processing of step S15 each time the processing from steps S12 to S16 is repeated, the game is advanced while changing the image of the display screen 51. Further, it is judged at step S16 if the proceeding game has ended or not. The processing according to this flow is ended when the game ends.

Figure 7:
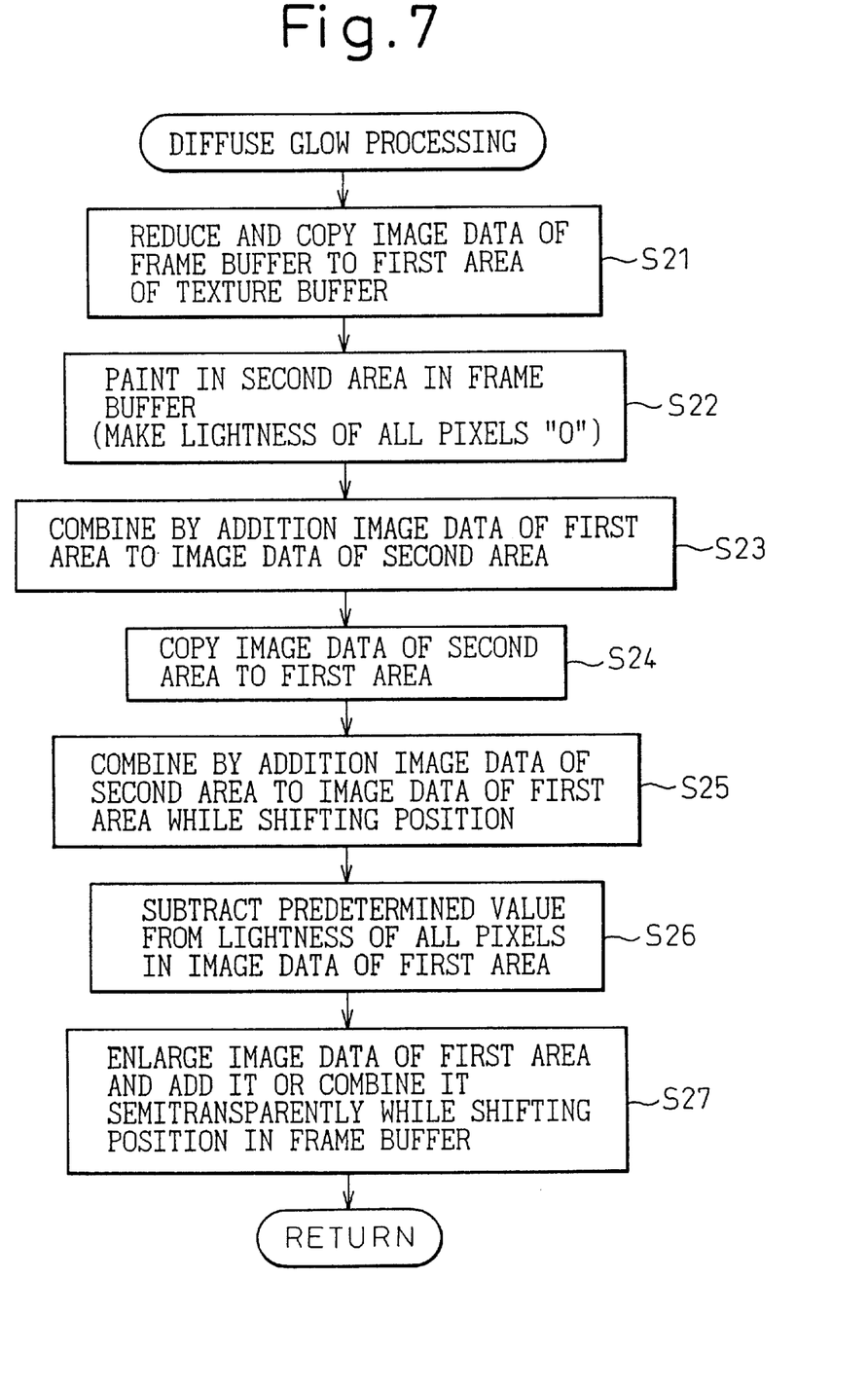
FIG. 7 is a flowchart of the routine of the diffused glow processing.

This diffuse glow processing is performed in accordance with the flowchart shown in FIG. 7. That is, the image data of the frame buffer 131 is reduced and copied in the first area 134 of the texture buffer 133 (step S21). Therefore, if assuming the image data P1 shown in FIG. 3 has been stored in the frame buffer 131, this reduced image data P2 is stored in the first area 134 of the texture buffer 133 by the processing of step S21. When performing this reduction and copying, the screen size is reduced (for example, the screen size is reduced from 640×480 pixels to 320×240) based on the data of the TEXTURE SIZE row of the DATA NAME column (see FIG. 5) and processing is performed for blurring the edges of the image by the use of a bilinear filter.

Next, the second area 135 in the texture buffer 133 is painted out (the lightness of all pixels is made "0") (step S22). That is, only the image data at the time of use in the previous processing is left at the second area 135. Therefore, by performing the processing of step S22, the second area 135 is initialized to the state where the lightness of all pixels is made "0". Accordingly, due to the processing of the step S22, the image data P3 left in the second area 135 is erased and image data P4 where the lightness of all of the pixels is "0" is produced at the second area 135.

Further, the image data of the first area 134 is combined with the second area 135 by addition (step S23). This combination by addition is performed using the following equation (a):

$$Pd1 = Pd0 + Ps \times \alpha \qquad (a)$$

where,
Ps: lightness of write pixel (0 to 1)
Pd0: lightness before writing of write pixel (0 to 1)
Pd1: lightness after writing of write pixel (0 to 1)

Therefore, due to the processing of step S23, the image data P5 comprising the image data of the image data P2 of the first area 134 multiplied in lightness by the α-value and the image data P4 with the lightness of all pixels made "0" is generated in the second area 135.

Next, the image data of the second area 135 is copied to the first area 134 (step S24). Due to this, the same image data P5 is stored in the first area 134 and the second area 135.

Next, the image data of the second area 135 is combined by addition with the image data of the first area while being shifted in position (step S25). This combination by addition is performed using equation (a) and the data relating to the primary shift combination. That is, the lightness of the image data of the second area 135 is multiplied by the α-value based on the data of the primary shift combination and the α-value. Further, the data is repeatedly added to the image data of the first area. At the time of addition, combination is performed for a number of times (number of combinations) corresponding to the number shown by the data of the number of primary shift combination filters. Further, at the time of addition, the image is shifted based on the shift degree shown by the data of the primary shift combination shift degree.

Figure 8A:
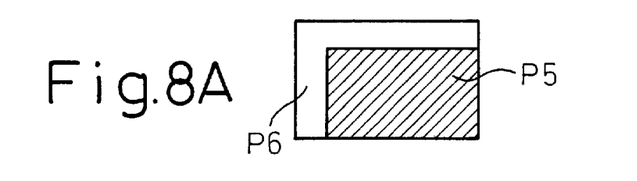
FIGS. 8A, 8B, 8C, 8D, 8E, 8F, 8G, and 8H are explanatory views of the processing in combination while shifting the position of the image.
Figure 8B:
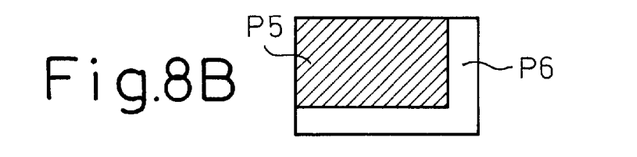
Figure 8C:
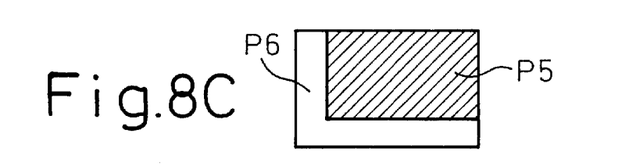
Figure 8D:
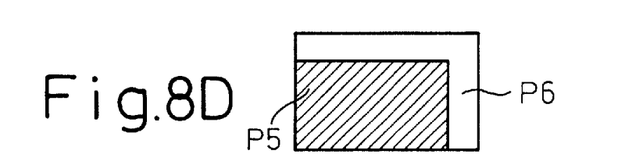
Figure 8E:
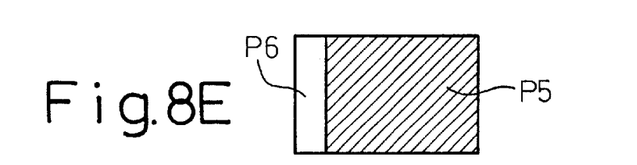
Figure 8F:
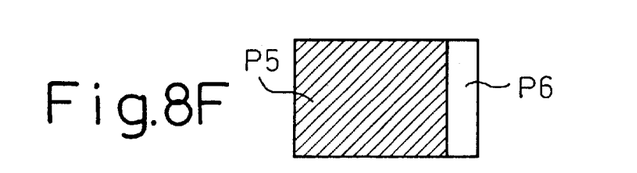
Figure 8G:
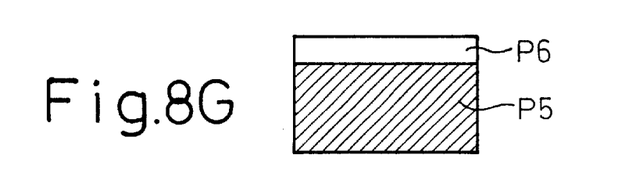
Figure 8H:
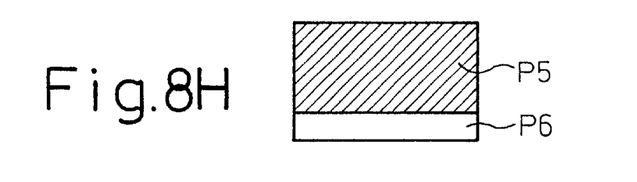

Here, if the number of combinations is made the standard value "4", the shift degree is a value for shifting the image data P5 of the second area 135 with respect to the image data P6 of the first area 134 in the diagonal directions (1) to (4) as shown in FIG. 8A, FIG. 8B, FIG. 8C, and FIG. 8D. If the number of combinations is made "8", the shift degree is a value for shifting the data in the left-right and top-down directions in FIG. 8E, FIG. 8F, FIG. 8G, and FIG. 8H. That is, FIG. 8A shows the state after shifting the image data P5 to the bottom right with respect to the image data P6, FIG. 8B shows the state of shifting to the top left, FIG. 8C to the top right, FIG. 8D to the bottom left, FIG. 8E to the right, FIG. 8F to the left, FIG. 8G to the bottom, and FIG. 8G to the top. Therefore, due to the combination by addition at step S25, image data where, as shown in FIG. 3, the image portions with a high lightness become higher in lightness and their surroundings become high in lightness by a distribution corresponding to the shift is generated in the first area 134.

Next, the lightness of all of the pixels of the image data of the first area 134 is subtracted by a predetermined value (step S26). This subtraction is performed using the following equation (b):

$$Pd1 = Pd0 - C \times \alpha \qquad (b)$$

where, C: predetermined lightness value, predetermined value (0 to 1)

Therefore, due to the processing of step S26, the lightness of the pixels of the image portions of less than the predetermined lightness becomes "0". Therefore, as shown in FIG. 3, image data P7 comprised of portions of more than a predetermined lightness, that is, image portions inherently of at least a predetermined lightness and portions of a high lightness at their surroundings generated at step S25, is generated in the first area 134.

Finally, the image data of the first area 134 is added or combined semitransparently in the original size or further enlarged while shifting the position in the frame buffer 131 (step S27). At this time, the addition is performed using the above equation (a) and the combination for semitransparency is performed using the following equation (c):

$$Pd1 = Ps \times \alpha + Pd0 \times (1-\alpha) \qquad (c)$$

Further, the addition or semitransparent combination is repeatedly performed on the image data of the frame buffer 131 while multiplying the lightness of the image data of the first area 134 by the α-value based on the data of the secondary shift combination color components and α-value. The number of additions is a number (number of additions) corresponding to the number shown by the data on the number of primary shift combination filters. At the time of combination by addition, the image is shifted based on the shift degree shown by the data of the secondary shift combination shift degree. Therefore, when the processing up to step S27 ends, due to the combination accompanied with the shift at the above step S25 and the combination accompanied with the shift at step S27, image data P8 where the image portions with the high lightness become higher in lightness and their surroundings become high in lightness by a distribution corresponding to the compositions accompanied with the two shifts is generated.

Figure 9:
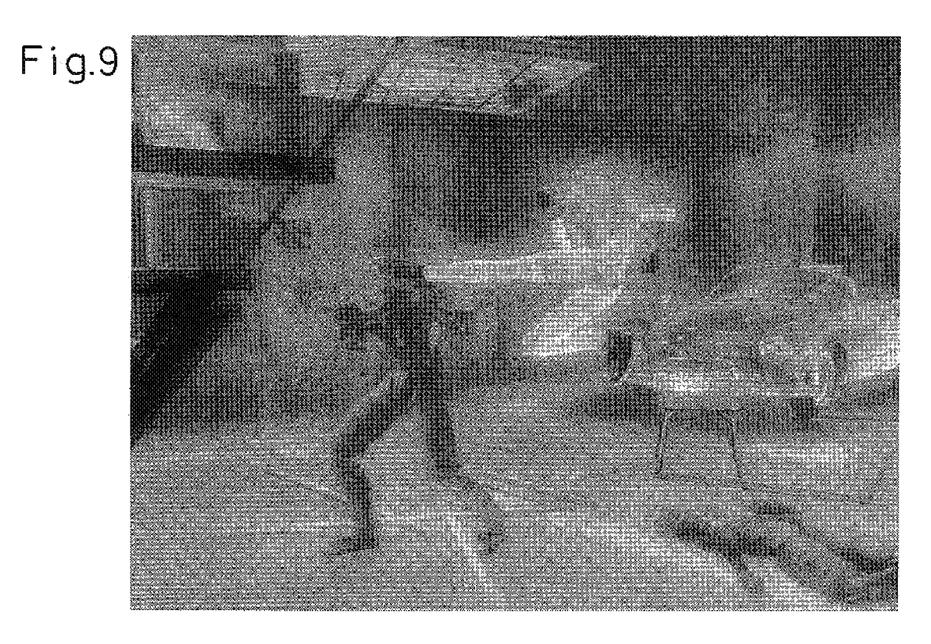
FIG. 9 is a view of an example of a display.

Therefore, by execution of the above screen processing (step S15) based on the image data P8, as illustrated in FIG. 9, a blurred and bright image of the characters in the game jumping about at the center, which were originally of more than the predetermined lightness, and their surroundings is displayed on the display screen 51.

Figure 10:
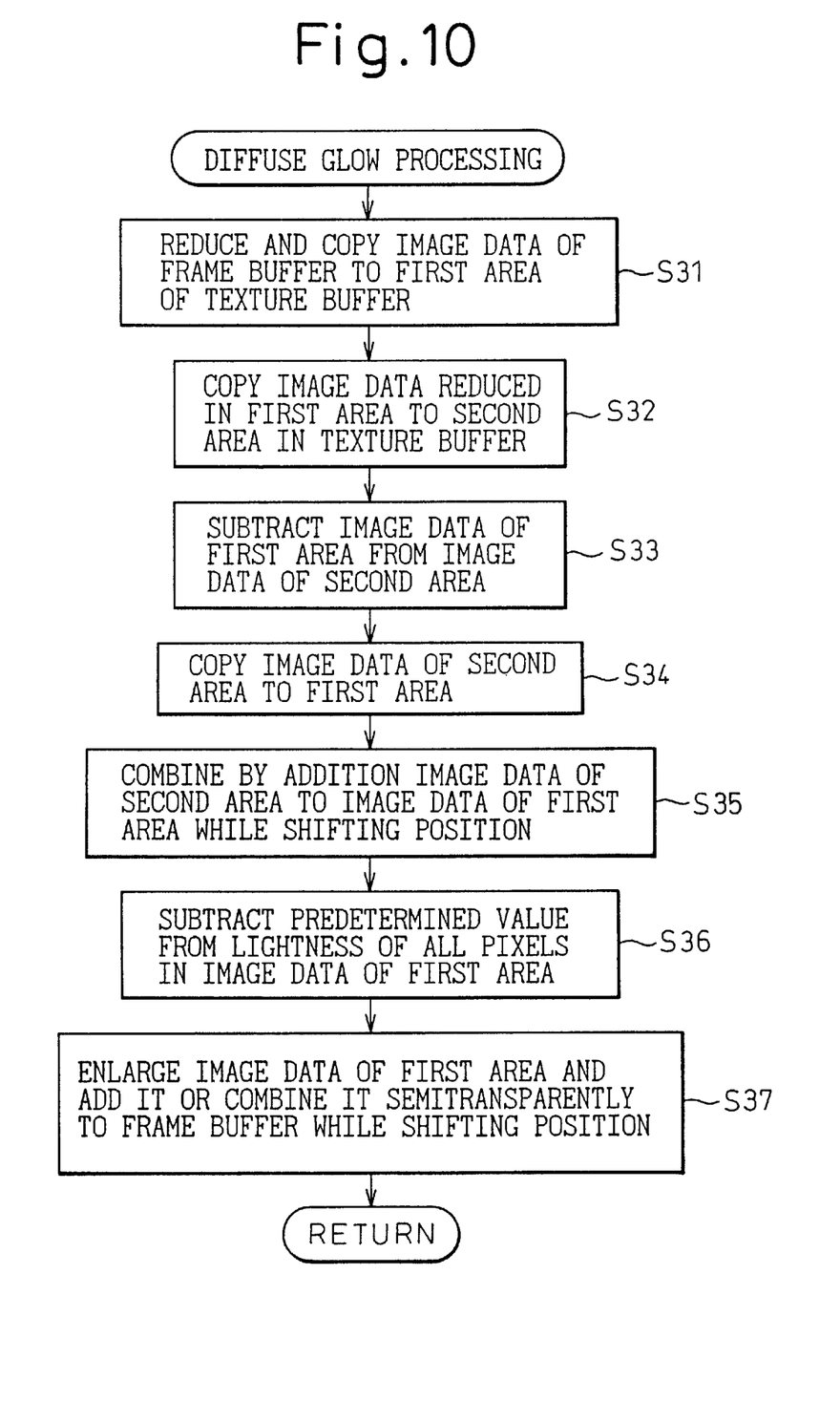
FIG. 10 is a flowchart of the routine of the diffused glow processing in a modification of an embodiment.

FIG. 10 shows a modification of the present embodiment. The processing of steps S31 and S34 to S37 is the same as that of step S21 and steps S24 to S27 shown in the above FIG. 7. Only steps S32 and S33 differ from the above steps S22 and S23. That is, the reduced image data in the first area 134 is copied to the second area 135 in the texture buffer (step S32). Due to the processing of this step S32, the same reduced image data is stored in the first area 134 and second area 135 in the texture buffer 133.

Next, the image data of the first area 134 is subtracted from the image data of the second area 135 (step S33). This combination by subtraction is performed by using the following equation (d):

$$Pd1 = Pd0 - Ps \times \alpha$$

At this time, the color components and α-value (R, G, B, α) at the time of combination by subtraction are the standard values (127, 127, 127, 4). Therefore, a similar result can be obtained as in the case of combination by addition using the standard values of the color components and α-value (127, 127, 127, 124) in the processing of step S21 of FIG. 6. Therefore, even when performing the diffuse glow processing in accordance with the flowchart shown in FIG. 10, it is possible to obtain similar actions and effects as the above.

Note that in the above embodiment, image data comprising only the portions of more than a predetermined lightness is acquired by subtraction, but it is also possible to obtain only image portions of more than a predetermined lightness by another method. For example, it is also possible to set the threshold value of the lightness and change the lightness of the portions with a lightness lower than the threshold value to the darkest lightness.

Note that in the above embodiment, the explanation was made of the case of realizing the present invention using a home game system as a platform, but the present invention may also be realized using a personal computer or other general computer or arcade game machine as a platform.

Further, the program or data for realizing the present invention was stored in the CDMA COMMUNICATION SYSTEM-ROM and the CDMA COMMUNICATION SYSTEM-ROM was used as a recording medium. The recording medium, however, is not limited to a CDMA COMMUNICATION SYSTEM-ROM and may also be a digital versatile disk (DVD) or other computer readable magnetic or optical recording medium or semiconductor memory. Further, it is possible to provide the program or data for realizing the present invention in a form preinstalled in a game console or computer storage device.

Further, the program or data for realizing the present invention may be downloaded for use to the HDD 10 from another piece of equipment on the network 17 connected by the communications interface 17 shown in FIG. 1 through the communications line 16. Further, it is possible to store the program or data in the memory of another piece of equipment on the communications line 16 and successively store and use that program or data in the RAM 9 in accordance with need through the communications line 16.

Further, the form by which the program or data for realizing the present invention is provided may also be a computer signal superimposed on a carrier wave from another piece of equipment on the network 17. In this case, transmission of the computer data signal is requested from another piece of equipment on the network 17 from the communications interface 15 through the communications line 16 and the transmitted computer signal is received and stored in the RAM 9. It is also possible to realize the present invention by the game console 1 using the program or data stored in the RAM 9 in this way.

Summarizing the effect of the invention, dummy image data comprising only image portions of more than a predetermined lightness are generated based on the image data comprising the display image and the image data and dummy data are combined by a positional relation where images shared by the image data and the dummy image data are shifted. Therefore, it is possible to have the image portions of more than a predetermined lightness and their surroundings displayed in a blurred and bright state and generate a soft focus effect for only specific portions of the game screen. Therefore, it becomes possible to generate a soft focus effect on an object with a certain degree of lightness on the game screen and improve the visual interest level.

While the invention has been described by reference to specific embodiments chosen for purposes of illustration, it should be apparent that numerous modifications could be made thereto by those skilled in the art without departing from the basic concept and scope of the invention.

What is claimed is:

1. A computer readable storage medium storing an image display program for making a computer:
   generate dummy image data comprising only image portions of at least a predetermined lightness based on original image data comprising a display image;
   combine the original image data and the dummy image data by a positional relationship where an image common to the original image data and the dummy original image data is shifted in position, the combination being performed a plurality of times while shifting the positional relationship of the original image data and the dummy image data; and
   display an image based on said combined image data.

2. The storage medium as set forth in claim 1, wherein, in the generation of the dummy image data, a predetermined amount is subtracted from the lightness of each pixel of the original image data to leave the image portions of at least a predetermined lightness.

3. The storage medium as set forth in claim 2, wherein, in the generation of the dummy image data, the lightness of the other portion of less than the predetermined lightness is set to the lowest adjustable lightness.

4. A computer readable storage medium storing an image display program for making a computer:
   generate first and second dummy image data based on original image data comprising a display image of a video game and combining the first and second dummy image data by a positional relationship where an image common to the first and second dummy image data is shifted;
   acquire third dummy image data comprising only image portions of at least a predetermined lightness based on said combined image;
   combine said acquired third dummy image data with said original image data; and
   display an image based on the original image data combined with the third dummy image data,
   wherein, in the combination of the first and second dummy image data and/or the combination of the third dummy image data and the original image data, the combination is performed a plurality of times by shifting the positional relationship of the common image in the combined image data.

5. The computer readable medium as set forth in claim 4, wherein, in the combination of the third dummy image data and the original image data, the third dummy image data and the original image data are combined by a positional relationship wherein an image common to the third dummy image data and the original image data is shifted in position.

6. The computer readable medium as set forth in claim 4, wherein,
   in the generation of the first and second dummy image data, reduced dummy image data comprised of the image data reduced in size is generated and,
   in the combination of the third dummy image data and the original image data, the size of the third dummy image data is enlarged to a size of at least the original image data and combined with the original image data.

7. An image display program for making a computer:
   generate dummy image data comprising only image portions of at least a predetermined lightness based on original image data comprising a display image;
   combine said original image data and said dummy image data by a positional relationship where an image common to said original image data and said dummy image data is shifted in position, the combination being performed a plurality of times while shifting the positional relationship of the original image data and the dummy image data; and
   display an image based on said combined image data.

8. The image display program as set forth in claim 7, wherein, in the generation of the dummy image data, a predetermined amount is subtracted from the lightness of each pixel of the original image data to leave the image portions of at least a predetermined lightness.

9. The image display program as set forth in claim 7, wherein, in the generation of the dummy image data, the lightness of the other portion of less than the predetermined lightness is set to the lowest adjustable lightness.

10. An image display program for making a computer:
    generate first and second dummy image data based on original image data comprising a display image of a video game and combining the first and second dummy image data by a positional relationship where an image common to the first and second dummy image data is shifted;
    acquire third dummy image data comprising only image portions of at least a predetermined lightness based on said combined image;
    combine said acquired third dummy image data with said original image data; and
    display an image based on the original image data combined with the third dummy image data,
    wherein, in the combination of the first and second dummy image data and/or the combination of the third dummy image data and the original image data, the combination is performed a plurality of times by shifting a positional relationship of the common image in the combined original image data.

11. The image display program as set forth in claim 10, wherein, in the combination of the third dummy image data and the combination image data, the third dummy image data and the image data are combined by a positional relationship wherein an image common to the third dummy image data and the original image data is shifted in position.

12. The image display program as set forth in claim 10, wherein, in the generation of the first and second dummy image data, reduced dummy image data comprised of the original image data reduced in size generated and, in the combination of the third dummy image data and the original image data, the size of the third dummy image data is enlarged to a size of at least the original image data and combined with the original image data.

13. An image display method comprising storing an image display program for making a computer:

generate dummy image data comprising only image portions of at least a predetermined lightness based on original image data comprising a display image;

combine said original image data and said dummy image data by a positional relationship where an image common to the original image data and said dummy image data is shifted in position, the combination being performed a plurality of times while shifting the positional relationship of the image data and the dummy image data; and display an image based on said combined image data.

14. The image display method as set forth in claim 13, wherein, in the generation of the dummy image data, a predetermined amount is subtracted from the lightness of each pixel of the original image data to leave the image portions of at least a predetermined lightness.

15. The image display method as set forth in claim 13, wherein, in the generation of the dummy image data, the lightness of the other portion of less that the predetermined lightness is set to the lowest adjust adjustable lightness.

16. An image display method comprising storing an image display program for making a computer:

generate first and second dummy image data based on original image data comprising a display image of a video game and combining the first and second dummy image data by a positional relationship where an image common to the first and second dummy image data is shifted;

acquire third dummy image data comprising only image portions of at least a predetermined lightness based on said combined image;

combine said acquired third dummy image data with said original image data; and display an image based on the original image data combined with the third dummy image data, wherein, in the combination of the first and second dummy image data and/or the combination of the third dummy image data and the original image data, the combination is performed a plurality of times by shifting a positional relationship of the common image in the combined image data.

17. The image display method as set forth in claim 16, wherein, in the combination of the third dummy image data and the original image data, the third dummy image data and the original image data are combined by a positional relationship wherein an image common to the third dummy image data and the original image data is shifted in position.

18. The image display method as set forth in claim 16, wherein, in the generation of the first and second dummy image data, reduced dummy image data comprised of the image data reduced in size is generated and, in the combination of the third dummy image data and the original image data, the size of the third dummy image data is enlarged to a size of at least the original image data and combined with the original image data.

19. A game system comprising:

a computer readable storage medium storing a program for controlling an image display of a video game, a computer for reading out and executing at least part of the program from the storage medium, and a display for displaying a video game realized by said computer, said computer, by reading part of the program from the storage medium, generating dummy image data comprising only image portions of at least a predetermined lightness based on original image data comprising a display image;

combining said original image data and said dummy image data by a positional relationship where an image common to the original image data and said dummy image data is shifted in position, the combination being performed a plurality of times while shifting the positional relationship of the original image data and the dummy image data, and displaying an image based on said combined image data.

20. A game system comprising:

a computer readable storage medium storing a program for controlling an image display of a video game, a computer for reading out and executing at least part of the program from the storage medium, and a display for displaying a video game realized by said computer, said computer, by reading part of the program from the storage medium, generating first and second dummy image data based on original image data comprising a display image of a video game and combining the first and second dummy image data by a positional relationship where an image common to the first and second dummy image data is shifted;

acquiring third dummy image data comprising only image portions of at least a predetermined lightness based on said combined image;

combining said acquired third dummy image data with said original image data; and displaying an image based on the original image data combined with the third dummy image data, wherein, in the combination of the first and second dummy image data and/or the combination of the third dummy image data and the original image data, the combination is performed a plurality of times by shifting a positional relationship of the common image in the combined image data.

* * * * *

UNITED STATES PATENT AND TRADEMARK OFFICE
CERTIFICATE OF CORRECTION

PATENT NO. : 6,697,082 B1
DATED : February 24, 2004
INVENTOR(S) : H. Takeuchi

It is certified that error appears in the above-identified patent and that said Letters Patent is hereby corrected as shown below:

Title page,
Item [57], ABSTRACT,
Line 4, "maker" should be -- makes --.

Column 13,
Line 37, "that" should be -- than --.

Signed and Sealed this

Fourth Day of January, 2005

JON W. DUDAS
*Director of the United States Patent and Trademark Office*